United States Patent
Blaze

(10) Patent No.: US 6,887,378 B2
(45) Date of Patent: May 3, 2005

(54) HANDLES FOR LENTICULAR FILTER CARTRIDGE

(75) Inventor: Martin Blaze, Hamden, CT (US)

(73) Assignee: CUNO Incorporated, Meriden, CT (US)

(*) Notice: Subject to any disclaimer, the term of this patent is extended or adjusted under 35 U.S.C. 154(b) by 347 days.

(21) Appl. No.: 10/123,952

(22) Filed: Apr. 17, 2002

(65) Prior Publication Data
US 2002/0153298 A1 Oct. 24, 2002

Related U.S. Application Data

(60) Provisional application No. 60/284,718, filed on Apr. 18, 2001.

(51) Int. Cl.[7] .............................................. B01D 29/41
(52) U.S. Cl. ........................ 210/238; 210/347; 210/470; 210/486
(58) Field of Search ................................. 210/237, 238, 210/346, 347, 470, 486; 294/74, 152, 157

(56) References Cited

U.S. PATENT DOCUMENTS

| 2,788,901 A | 4/1957 | Boeddinghaus et al. |
| 5,482,624 A | 1/1996 | Swiatek et al. |
| 5,607,584 A | 3/1997 | Swiatek et al. |
| 5,965,019 A | 10/1999 | Olsen et al. |
| 6,139,253 A | 10/2000 | Battrel |

FOREIGN PATENT DOCUMENTS

| GB | 2185695 | * 7/1987 | ........... B01D/29/34 |
| WO | WO 98/35740 | * 8/1998 | ........... B01D/25/26 |
| WO | WO 02/18030 | 3/2002 | |

* cited by examiner

Primary Examiner—Matthew O. Savage
(74) Attorney, Agent, or Firm—R. Thomas Payne; John A. Tomich

(57) ABSTRACT

A filter cartridge assembly, and method for constructing the same, wherein the assembly has at least two axially adjacent filter cells separated by a spacer ring and a lifting means having a mounting portion with an opening formed therein for surrounding the outer periphery of the spacer ring. The lifting means also includes opposed elongated arms which extend radially outwardly from the central mounting portion and have gripping portions for facilitating lifting the filter cartridge assembly.

15 Claims, 5 Drawing Sheets

HANDLES FOR LENTICULAR FILTER CARTRIDGE

CROSS-REFERENCE TO RELATED APPLICATION

The subject application claims the benefit of commonly owned U.S. Provisional Application Ser. No. 60/284,718, filed Apr. 18, 2001, the disclosure of which is herein incorporated by reference thereto.

BACKGROUND OF THE INVENTION

1. Field of the Invention

The present disclosure relates to fluid filtration devices, and more particularly, to a lenticular filter cartridge that includes handles for facilitating the transport, installation and removal of filter cartridges from the filter cartridge housing.

2. Background of the Related Art

Cell type filter assemblies, often referred to as lenticular filter assemblies, are well known in the art and have been employed in fluid processing systems for many years. An early example is disclosed in U.S. Pat. No. 2,788,901 to Boeddinghaus et al., and a more recent example is disclosed in U.S. Pat. No. 5,965,019 to Olsen et al. Lenticular filter assemblies often include a plurality of concentric filtration cells which are spaced apart axially in relation to one another. One or more filter assemblies may be disposed in a cylindrical housing. Typically, such a filter housing is formed by structural portions which are secured together by conventional clamping devices that allow for access to the interior of the housing to facilitate filter replacement and maintenance.

The wet filter cartridge assembly is removed from the filter housing by grasping the edge of the filter cells and lifting out. Unfortunately, the wet filter cells can be difficult to grasp and may tend to break when subjected to such manipulation. Because the lifting forces are directed around the periphery of the assembly and the majority of the load of the cartridge is directed toward the center thereof, the likelihood of a cartridge breaking during this method of lifting is increased.

There are several unfortunate consequences when a filter cartridge assembly breaks during removal. Primarily, unwanted filtered material may enter either the inlet or outlet of the filter housing. Thus, the technician responsible is required to spend additional time cleaning the housing. Furthermore, the entire filtration system must be flushed, thus adding expensive downtime to the attendant manufacturing process.

It is known to provide integral handles for lifting and carrying lenticular filter cartridge assemblies during replacement and maintenance operations as disclosed in U.S. Pat. Nos. 5,482,624 and 5,607,584 to Swiatek et al., the disclosures of which are herein incorporated by reference in their entireties The handles on these filters are attached to the gasket retainer ring at either end of the cartridge, or are provided as straps which extend across the outer periphery of the top filter cell. In either instance, the handles or straps could prevent a proper fit or seal between the gasket retainer and the cartridge housing, potentially creating a leak path.

It would be beneficial therefore, to provide a lenticular filter cartridge assembly that has integral handles that do not present any sealing problems Not only, does the present invention tend to eliminate these problems, but perhaps most importantly, it provides a means that makes filter cartridge removal easier and safer than it has been.

SUMMARY OF THE INVENTION

The subject disclosure is directed to a new and useful lenticular filter cartridge assembly that includes a plurality of interconnected filter cells arranged in coaxially spaced apart relationship, and means for carrying the interconnected filter cells to facilitate ease of transport, installation and removal of the cartridge. In accordance, the carrying means is disposed between axially adjacent filter cells.

In one embodiment of the subject disclosure, the means for carrying the filter cartridge assembly comprises a single integral handle member that is die cut from a thin, flexible, light-weight piece of plastic material, and has a central apertured portion for engagement about the central core of the cartridge between axially adjacent filter cells, with opposed grasping portions extending radially outwardly from the central apertured portion. In another embodiment of the subject disclosure, the means for carrying the cartridge comprises a pair of injection molded handles, each including a ring portion for engaging the central core of the cartridge assembly between axially adjacent filter cells, and a grasping portion extending from the ring portion.

In particular, a lifting device for a filter cartridge assembly having at least two axially adjacent filter cells separated by a spacer ring disposed between the axially adjacent filter cells is disclosed. In this embodiment, the lifting device includes a central mounting portion having an opening formed therein for surrounding the outer periphery of the spacer ring and opposed elongated arms extending radially outwardly from the central mounting portion. Also, each arm includes a gripping portion at a radially outer end thereof for lifting the filter cartridge. The gripping portion may include an annular ring or a bail.

In other aspects of a device constructed in accordance with the present disclosure, the central mounting portion or arms may be substantially planar. The central mounting portion may also be integrally associated with the opposed elongated arms. Furthermore, the opening within the central mounting portion may be made to securably engage the outer periphery of the spacer ring.

In another embodiment of a device constructed in accordance with the present disclosure, the length of the opposed arms depends on the location of the central mounting portion in the filter cartridge assembly. Alternatively, the length of the opposed arms depends on the location of the filter cartridge assembly in the filter cartridge housing.

The lifting device disclosed herein may be fabricated from die-cut or injection-molded plastic. In one embodiment, one or more layers of plastic material, such as polypropylene, are used. The layers can be welded together.

The present disclosure is also directed to a filter cartridge assembly which comprises at least two filter cells (through which fluids are passed for filtration) axially spaced apart by a spacer ring and lifting means operatively associated with the spacer ring for moving the filter cartridge assembly. Preferably, the lifting means is fabricated from an inert and resilient material, such as polypropylene.

In one embodiment of the aforementioned filter cartridge assembly, the lifting means consists of a central mounting portion having an opening for surrounding the spacer ring and opposed arms extending radially outward from the central mounting portion, with each arm including a gripping portion.

In another embodiment of the aforementioned filter cartridge assembly, the lifting means comprises two independent members, wherein each member has a mounting portion with an opening for surrounding the spacer ring and an arm extending outwardly from the mounting portion having a gripping portion.

In other aspects of either embodiment, the lifting means may be planar or tubular, fabricated from one or more layers of a substantially planar material, die-cut or injection-molded plastic. The gripping portion may also be a ring or bail.

The present disclosure is also directed to a method for constructing a filter cartridge assembly. The steps in this method include: arranging at least two filter cells in an axially aligned manner; positioning a spacer ring for between the at least two filter cells so as to form a gap therebetween; and positioning a lifting means in the gap defined between the at least two filter cells.

The aforementioned method may also include the step of positioning the filter assemblies in a filter housing.

In one embodiment in accordance with the present disclosure, the step of providing lifting means further includes providing a lifting means having a central mounting portion with an opening for surrounding the spacer ring and opposed elongated arms extending radially outwardly from the central mounting portion wherein the arms include a gripping portion.

In another embodiment, the step of providing a lifting means further includes providing a lifting means having two elongated arms with a gripping portion, wherein the length of the elongated arms depends on the placement of the filter cartridge assemblies in a filter cartridge housing.

These and other aspects of the subject disclosure and the method of using the same will become more readily apparent to those having ordinary skill in the art from the following brief description of the drawings taken in conjunction with the detailed description provided below.

BRIEF DESCRIPTION OF THE DRAWINGS

So that those having ordinary skill in the art to which the subject disclosure pertains will more readily understand how to make and use the subject disclosure, preferred embodiments thereof will be described in detail hereinbelow with reference to the drawings, wherein.

DETAILED DESCRIPTION OF THE DRAWINGS

Figure 1:
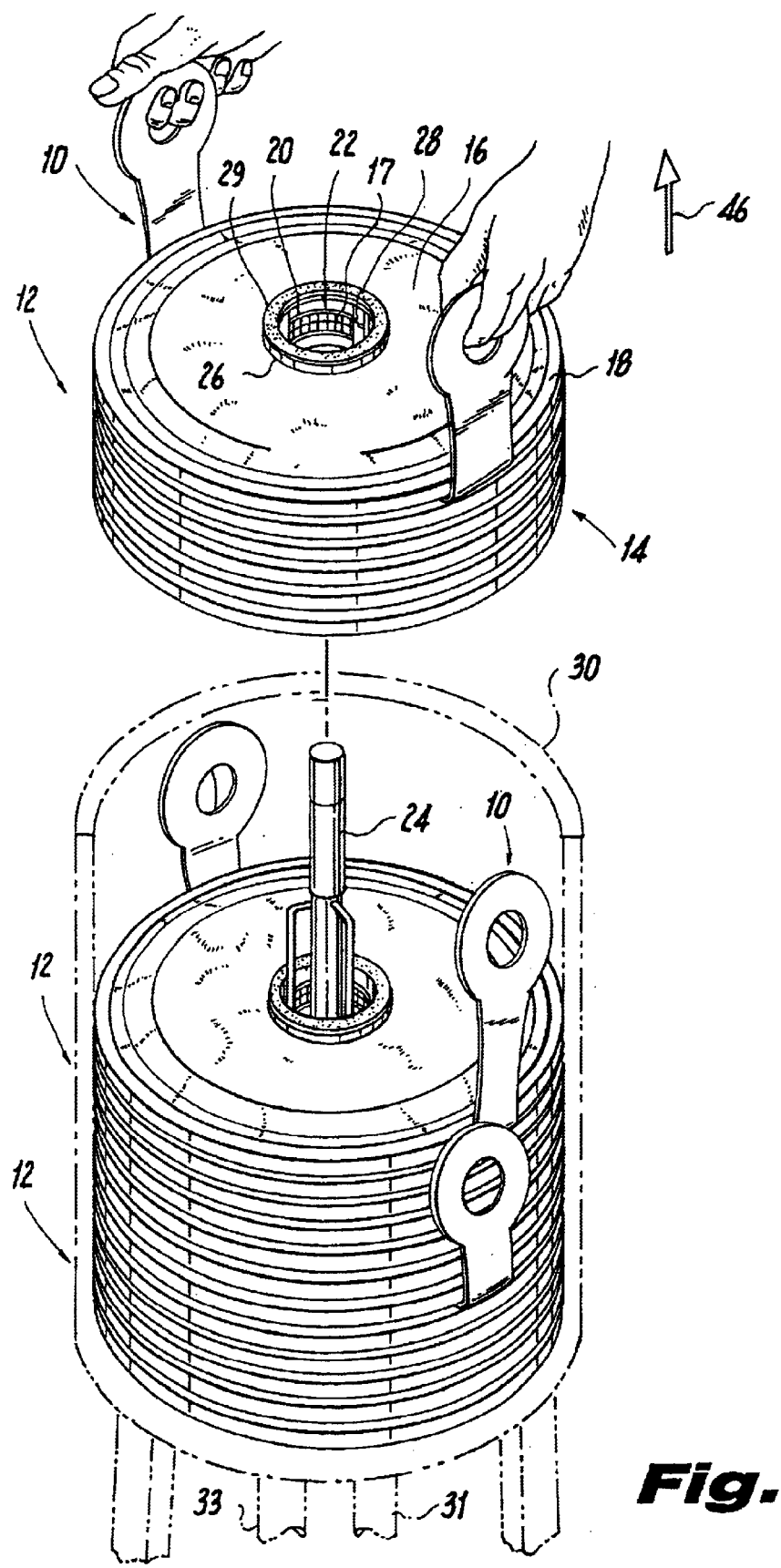
FIG. 1 is a perspective view of one of three lenticular filter cartridges assemblies constructed in accordance with an embodiment of the subject disclosure being removed from a filter cartridge housing, wherein the filter cartridge assemblies include planar lifting devices for moving the assembly into and out of the filter cartridge housing.

The following detailed description of preferred and/or exemplary embodiments of the present disclosure is intended to be read in the light of, or in context with, the preceding summary and background descriptions. Unless otherwise apparent, or stated, directional references, such as "up", "down", "left", "right", "below", "above", "top" and "bottom" are intended to be relative to the orientation of a particular embodiment of the disclosure as shown in the first numbered view of that embodiment. Also, a given reference numeral should be understood to indicate the same or a similar structure when it appears in different figures.

Figure 4:
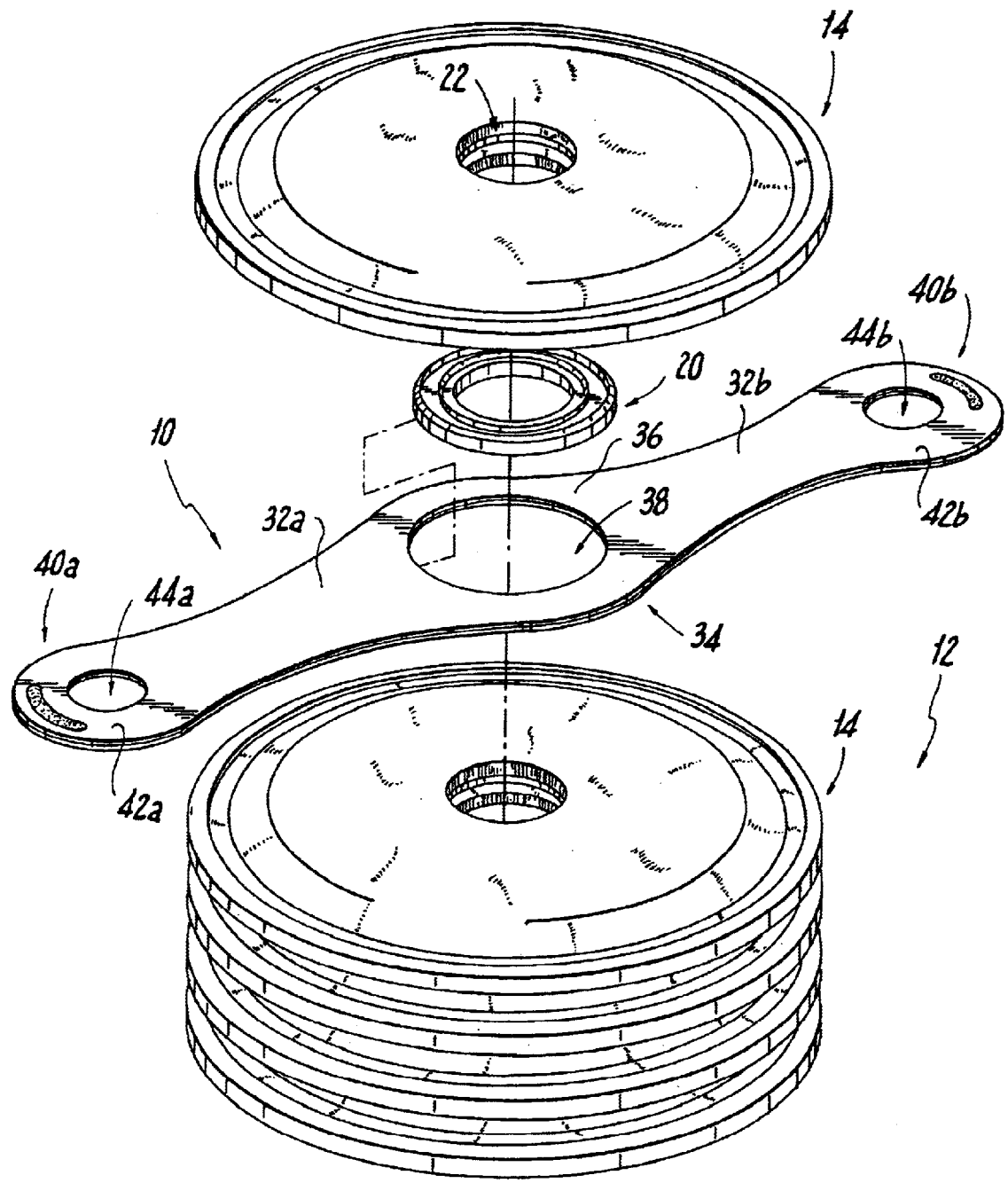
FIG. 4 is a partially exploded perspective view of a lenticular filter cartridge assembly constructed in accordance with an embodiment of the subject disclosure illustrating one way in which the planar lifting device may be operatively associated with the filter cartridge assembly.

With reference to the drawings, and in particular to FIG. 1, a lifting device (hereinafter referred to as a "handle"), referred to generally by the numeral 10, constructed in accordance with the present disclosure is employed on a filter cartridge assembly 12. Assembly 12 may include at least two filter cells 14, and typically will consist of a plurality of filter cells of the same or substantially same construction as filter cell 14. The filter cells 14 are stacked concentrically to form assembly 12, as shown in FIGS. 1 and 4. Although each filter cell 14 is shown as having a circular construction, it should be appreciated that its shape may be of any configuration desired to achieve the desired filtration process and fit within a filter housing.

In this embodiment, each filter cell 14 consists of an upper and lower filtration media, collectively referred to by the numeral 16. The upper and lower filtration media 16 are separated by a porous spacer ring 17 disposed along the inner periphery of the filtration media 16. Edge 18 extends completely around the outer periphery of the filtration media 16 and fastens the same. As illustrated in FIGS. 1 and 4, a spacer ring 20 is disposed between axially adjacent filter cells 14. Spacer ring 20, which may be porous or non-porous, contacts the inner periphery of the filtration media 16. In this embodiment, spacer ring 20 is non-porous.

Porous spacer ring 17 and spacer ring 20 help to define an aperture 22 extending axially through assembly 12. Preferably, aperture 22 is located at about the center of each filter cell 14. When constructing the filter assembly 12, the porous spacer ring 17 of each filter cell 14 and spacer rings 20 between each filter cell 14 are aligned axially to form aperture 22. Aperture 22 is sufficiently sized for receiving a filtration housing center mount 24 (which is discussed in further detail below) while also permitting fluid flow axially through aperture 22 and along center mount 24. Annular end rings 26 are positioned on the top and bottom filter cells 14 of filter assembly 12 concentrically with respect to aperture 22. One or more bands 28 extend axially through aperture 22 and engage both top and bottom annular end rings 26 to form the rigid filter cartridge assembly 12. A gasket 29 is inserted in a annular recess disposed in each end ring 26 which helps to stabilize the filter assemblies 12 when stacked vertically, among other things. Preferably, gasket 29 is constructed of a substantially inert, resilient and durable material, such as a rubberized media.

In a typical filtration system, one or more filter assemblies 12 are seated around a center mount 24 which extends vertically in a filter housing 30. A portion of center mount 24 is connected with the outlet 33 from housing 30. During operation of the filtration system, unfiltered fluid pumped through the inlet 31 into filter housing 30 passes through the filter media 16 and flows through porous spacers 17 into aperture 22. Fluid flowing in aperture 22 flows out of filter housing 30 via outlet 33.

Transporting, installing and removing the one or more filter assemblies 12 typically used in a filtration system is made easier by handle 10. Handle 10 is configured such that it will not interfere with the normal operation of the filter housing 30 (such as for example, by interfering with the gasket 29), and may be constructed integrally with assembly 12 or subsequently installed thereon. As shown best in FIGS. 2 and 3, handle 10 has elongated arms 32a and 32b that extend from a mounting portion 34 having an assembly support section 36 defining an opening 38. The opposing ends of arms 32a and 32b have an end portion 40a and 40b configured and shaped to facilitate being gripped securely, such as by hand or mechanical device, like a hoist, hook or other clamping means. In this embodiment, the end portions 40a, 40b each have lift support rings 42a and 42b, defining an opening 44a and 44b, respectively. Openings 44a, 44b facilitate gripping support rings 42a, 42b, and thus, make it easier to lift assembly 12. FIG. 1 illustrates as an example, a person in the act of lifting of an assembly 12 from the housing 30 in the direction of arrow 46. A hand is shown on each lift support ring 42a, 42b with fingers wrapped through openings 44a, 44b for an improved grip. Preferably, arms 32a, 32b are substantially the same size so that the force exerted on both lift support rings 42a, 42b while lifting assembly 12 is substantially the same. This would also permit assembly 12 to be supported by inserting a rod through openings 44a, 44b in both lift support rings 42a, 42b.

Handle 10 is attached to filter assembly 12 at mounting portion 34. Opening 38 in mounting portion 34 is dimensioned so that it is of a larger than the diameter of spacer ring 20. Alternatively, opening may be sized so that assembly support section 36 contacts the outer periphery of spacer ring 20. In either embodiment, the assembly support section 36 is disposed around spacer ring 20 and below at least one filter cell 14 in assembly 12, as shown in FIG. 4. However, mounting portion 34 may be operatively associated with a filter cell 14 more than one below the top of assembly 12.

Handle 10 is constructed of a resilient, inert material with sufficient tensile strength for lifting a wet filter assembly 12 while still allowing the arms 32a, 32b to be flexible for manipulation in conjunction with lifting assembly 12 out of the filter housing 30. Thus, it is preferable that handle 10 be constructed of a plastic material that is rigid, yet slightly flexible and tear-resistant, among other things, and of sufficient thickness or layered to prevent breakage. However, it should also be appreciated that handle 10 could be constructed of another material, such as a stranded or solid steel wire.

Figure 2:
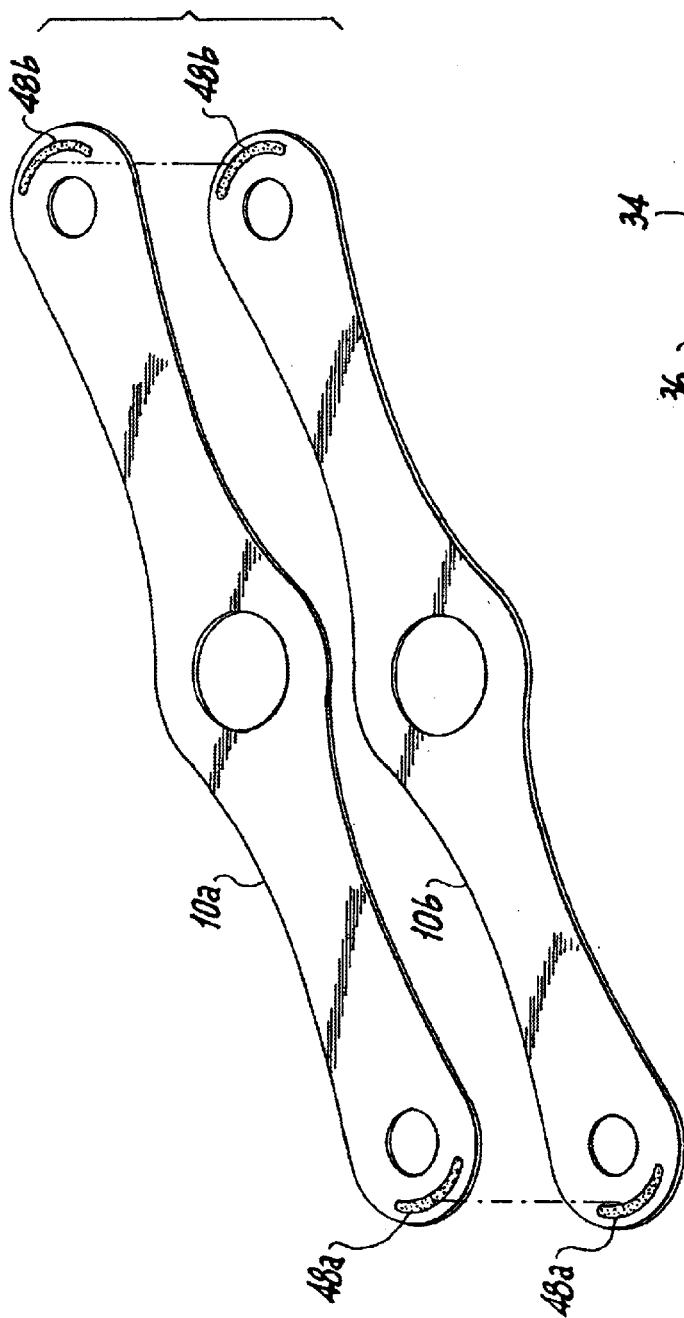
FIG. 2 is a perspective view of a planar lifting device like the one illustrated in FIG. 1, wherein the planar lifting device is shown as consisting of two layers secured to each other in accordance with an embodiment of the subject disclosure.
Figure 3:
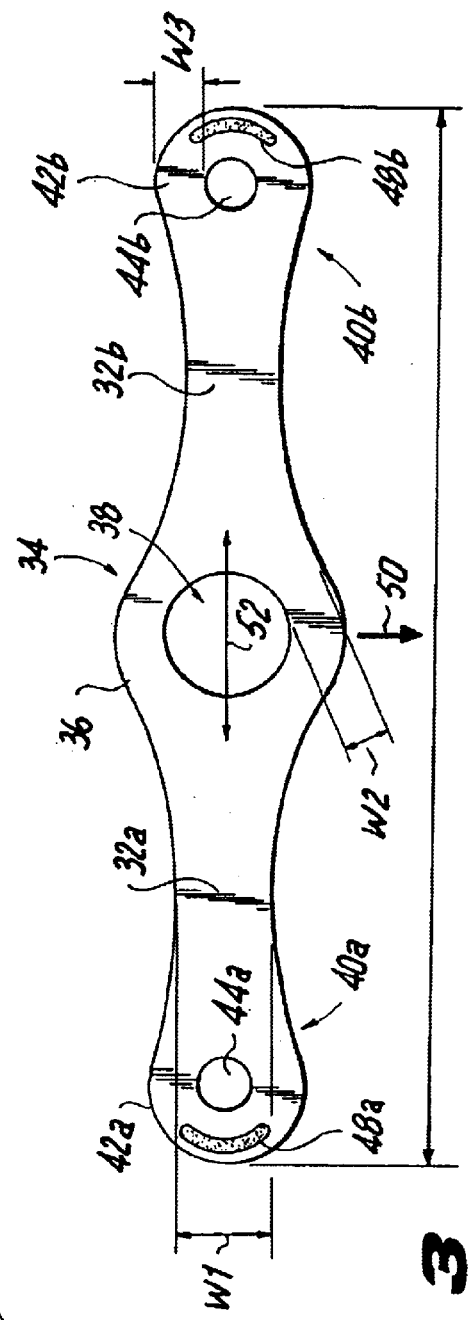
FIG. 3 is a top view of the planar lifting device shown in FIG. 2.

As shown in FIG. 2, the handle 10 of this embodiment is constructed of two pieces of die cut polypropylene 10a and 10b. The pieces are attached via heat welding, sonic welding, adhesives or other known techniques. Preferably, the two polypropylene pieces 10a, 10b are attached to each other at points 48a and 48b in lift support rings 42a, 42b. Pieces 10a, 10b provide an essentially integral handle 10.

Preferably, handle 10 is substantially planar. However, the thickness of each piece 10a, 10b may range from about 0.25 mm to about 1 mm (or no greater than the thickness of retainer ring 20 at mounting portion 34 when 10a and 10b are combined), but preferably is about 0.5 mm. The length of each arm 32a, 32b from a latitudinal axis 50 through the center point of opening 38 may range from about 33 cm to about 41 cm, but preferably is about 35.5 cm. Ideally, the length of arms 32a, 32b are such that a sufficient amount will extend out from the top filter cell 14 of assembly 12 so as to provide an adequate length for manipulating the filter cartridge assembly 12. It should be appreciated that arms 32a, 32b provide enough clearance between the filter cartridge assembly 12 and end portions 40a, 40b for the technician to insert his or her hands in openings 44a, 44b to lift each filter cartridge assembly 12 out of filter housing 30.

The diameter of opening 38 may range from about 6.5 cm (or no less than the diameter of spacer ring 20) to about 12.5 cm, but preferably is about 8.3 cm. The diameter of openings 44a, 44b may range from about 3 cm to about 5 cm, but preferably is about 3.75 cm. The width W1 of arms 32a, 32b may range from 5 cm to about 8 cm, but preferably is about 6.5 cm. The width W2 of assembly support section 36 may range from about 2.5 cm to about 5 cm, but preferably is about 3.5 cm. The width W3 of lift support rings 42a, 42b may range from about 2.5 cm to about 5 cm, but preferably is about 3.25 cm. Preferably, handle 10 is symmetrical about the latitudinal axis 50 and longitudinal axis 52 through the center point of opening 38.

Of course, similar embodiments may be utilized to obtain the desired result of easy removal of a filter cartridge assembly.

Figure 5:
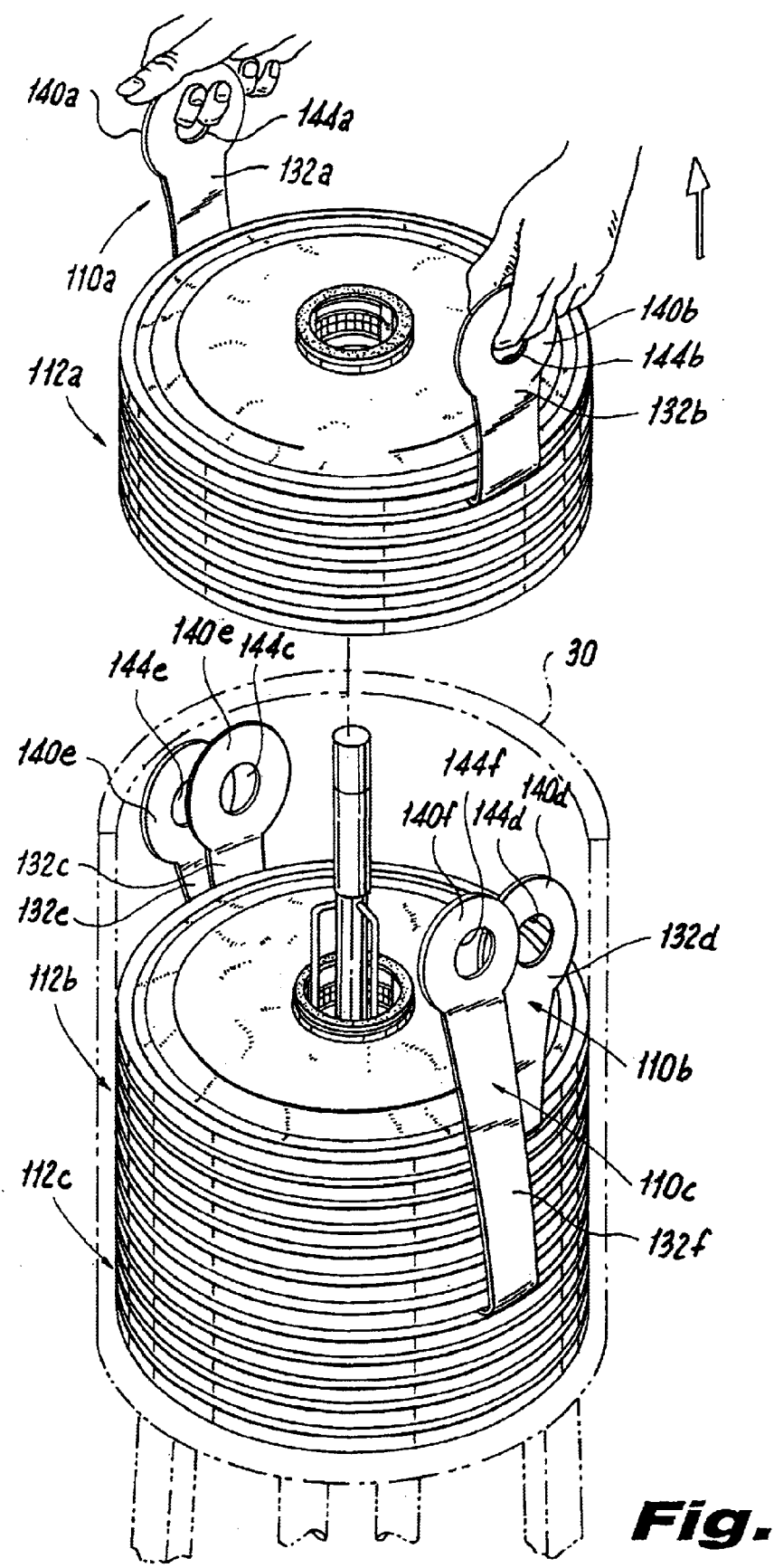
FIG. 5 is a perspective view of one of three lenticular filter cartridges assemblies constructed in accordance with another embodiment of the subject disclosure being removed from a filter cartridge housing, wherein the filter cartridge assemblies include planar lifting devices for moving the assembly into and out of the filter cartridge housing.

FIG. 5 illustrates an alternative embodiment in which the opposed arms are sized according to the relative position of the filter cartridge assembly in the housing. As shown, the uppermost assembly 112a in housing 30 has a handle 110a with arms 132a, 132b, which are substantially similar to those shown in the previous embodiment of the present disclosure. The adjacent (or "middle") assembly 112b below assembly 112a in housing 30, has a handle 110b with arms 132c and 132d which are elongated to a greater extent than arms 132a, 132b. Arms 132c, 132d are sufficiently elongated to permit its end portions 140c and 140d substantially reach the same point in housing 30 as end portions 140a and 140b from arms 132a, 132b, respectively. The next adjacent assembly 112c to the middle assembly 112b (i.e., below assembly 112b in housing 30) has a handle 110c with arms 132e and 132f that are sufficiently elongated to permit end portions 140e and 140f to substantially reach the same point in housing 30 as end portions 140a, 140b, 140c and 140d. Preferably, arms 132a, 132b, 132c, 132d, 132e and 132f are configured and dimensioned so that openings 144a, 144b, 144c, 144d, 144e and 144f are capable of being aligned, which enables a rod, hook, or other device to be inserted therethrough. This practice can facilitate lifting of assemblies 112a, 112b and 112c concurrently, by hand or mechanical device, among other things. Naturally, the depiction of three filter cartridge assemblies is used as an example for descriptive purposes to illustrate features of the embodiment in accordance with the present disclosure. The concepts associated with this embodiment may also be incorporated in filtration systems using more or less filter cartridge assemblies.

Figure 6:
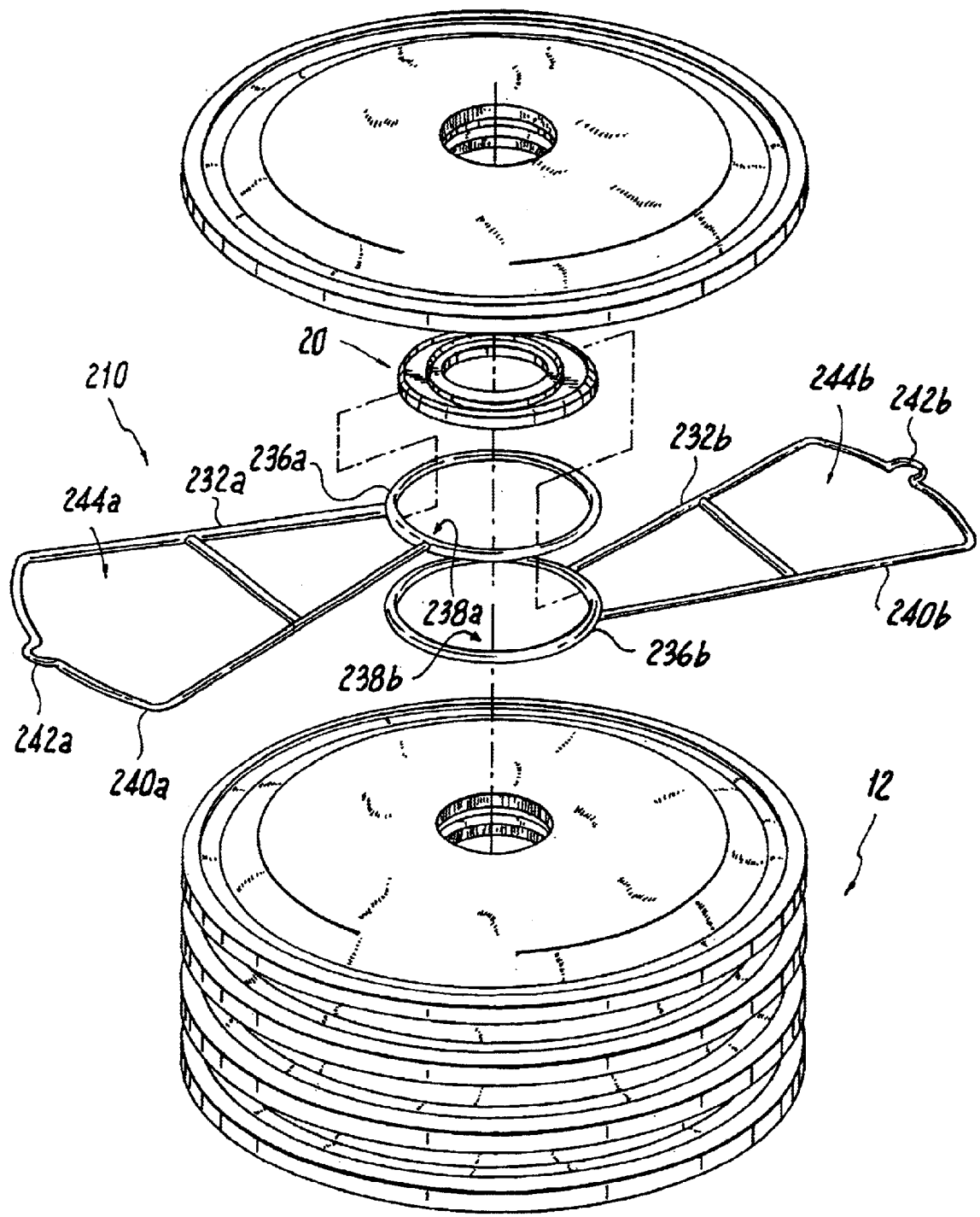
FIG. 6 is a partially exploded perspective view of a lenticular filter cartridge assembly constructed in accordance with another embodiment of the subject disclosure illustrating one way in which a tubular lifting device may be operatively associated with the filter cartridge assembly.

FIG. 6 illustrates another alternative lifting device is depicted for lifting the cartridge assembly 12, generally designated by the numeral 210. Handle 210 consists of two independent, substantially identical arms 232a and 232b. Arms 232a and 232b are associated with assembly support sections 236a and 236b, respectively, which are disposed around spacer ring 20. Thus, openings 238a and 238b in support sections 236a, 236b have a diameter at least greater than the diameter of spacer ring 20. Furthermore, the thickness of the two assembly support sections 236a, 236b taken together, must be no greater than the thickness of retainer ring 20, to enable both sections 236a and 236b to fit between filter cells 14 in assembly 12.

End portions 240a and 240b have curved, semi-circular lift support bails 242a and 242b, and define openings 244a and 244b, respectively. The openings 244a, 244b and lift support bails 242a, 242b facilitate gripping end portions 240a, 240b, among other things, which makes it easier to lift assembly 12. Preferably, arms 232a, 232b are substantially the same size so that the force exerted on both end portions 240a, 240b while lifting assembly 12 is substantially the same.

As shown, all components of handle 210 are of a solid, tubular shape and may be fabricated integrally via injection molding of a plastic material, such as polypropylene, or another material that is rigid, yet slightly flexible and possesses the tensile strength necessary to support the weight of a wet filter cartridge assembly 12.

Thus, it can be seen by those skilled in the art, that the removal of a wet filter cartridge assembly is greatly facilitated by using a device fabricated in accordance with the present disclosure. It should also be apparent that the use of an a device in accordance with the present disclosure reduces the technician's exposure to the fluid stream and contaminants being filtered.

Based upon the foregoing disclosure, it should now be apparent that the use of the device and the method described herein will carry out the object set forth hereinabove. Although the lifting device for filter cartridge assemblies of the present disclosure has been described with respect to exemplary and preferred embodiments, those skilled in the art will readily appreciate that changes and modifications may be made thereto without departing from the spirit and scope of the present disclosure as defined by the appended claims. For example, it should be apparent to those skilled in the art that the device and method of the present invention can be practiced with a variety of different size filter cartridges and handle configurations.

What is claimed is:

1. Filter cartridge assemblies, comprising:
    a) at least two filter cells through which fluids are passed for filtration, the filter cells having central apertures therethrough for the passage of fluid therein, wherein the filter cells are axially spaced apart by a spacer ring disposed therebetween; and
    b) lifting means operatively associated with the spacer ring for moving the filter cartridge assembly into and out of a filter housing, wherein the lifting means comprises a central mounting portion having an opening for surrounding the spacer ring and opposed arms extending radially outward from the central mounting portion, each arm including a gripping portion.

2. Filter cartridge assemblies as recited in claim 1, wherein the lifting means is fabricated from an inert and resilient material.

3. Filter cartridge assemblies as recited in claim 1, wherein the lifting means is fabricated from polypropylene.

4. Filter cartridge assemblies as recited in claim 1, wherein the gripping portion is ring-shaped.

5. Filter cartridge assemblies as recited in claim 1, wherein the mounting portion and opposed arms are substantially planar.

6. Filter cartridge assemblies as recited in claim 1, wherein the mounting portion and opposed arms are fabricated from one or more layers of a substantially planar material.

7. Filter cartridge assemblies as recited in claim 6, wherein the material is a die-cut plastic.

8. A filter cartridge assembly, comprising:
    a) at least two filter cells through which fluids are passed for filtration, the filter cells having central apertures therethrough for the passage of fluid therein, the filter cells being operatively spaced apart by a spacer ring disposed therebetween; and
    b) lifting structure, operatively associated with the spacer ring, for moving the filter cartridge assembly into and out of a filter housing, wherein the filter cells have an outer diameter and the structure extends radially outward from the spacer ring beyond the outer diameter of the filter cells.

9. Filter cartridge assembly of claim 8, wherein the lifting means is fabricated from an inert and resilient material.

10. Filter cartridge assembly of claim 8, wherein the lifting means is fabricated from polypropylene.

11. Filter cartridge assembly of claim 8, wherein the lifting structure comprises:
    a central mounting portion having an opening for surrounding the spacer ring and opposed arms extending radially outward from the central mounting portion, each arm including a gripping portion.

12. Filter cartridge assembly of claim 8, wherein the gripping portion is ring-shaped.

13. Filter cartridge assembly of claim 8, wherein the mounting portion and opposed arms are substantially planar.

14. Filter cartridge assembly of claim 8, wherein the mounting portion and opposed arms are fabricated from one or more layers of a substantially planar material.

15. Filter cartridge assembly of claim 14, wherein the material is a die-cut plastic.

* * * * *